March 1, 1927.  
F. WEVER  
1,619,493  
FEATHER LINED MATERIAL AND PROCESS OF MAKING THE SAME  
Original Filed May 15, 1922  7 Sheets-Sheet 1
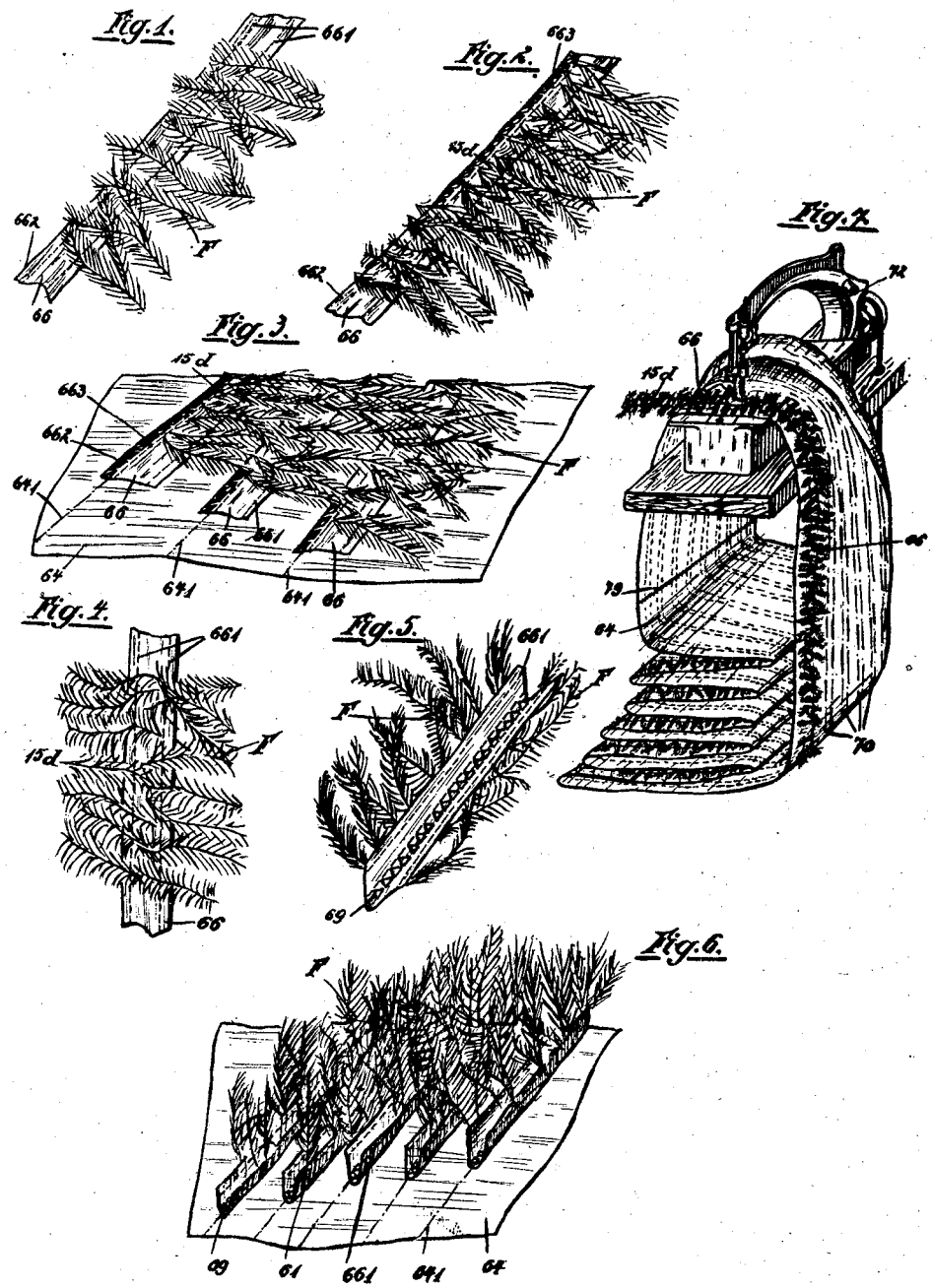

March 1, 1927.

F. WEVER 1,619,493

FEATHER LINED MATERIAL AND PROCESS OF MAKING THE SAME

Original Filed May 15, 1922    7 Sheets-Sheet 2

INVENTOR
Fritz Wever
BY Sturtevant & Mason
ATTYS.

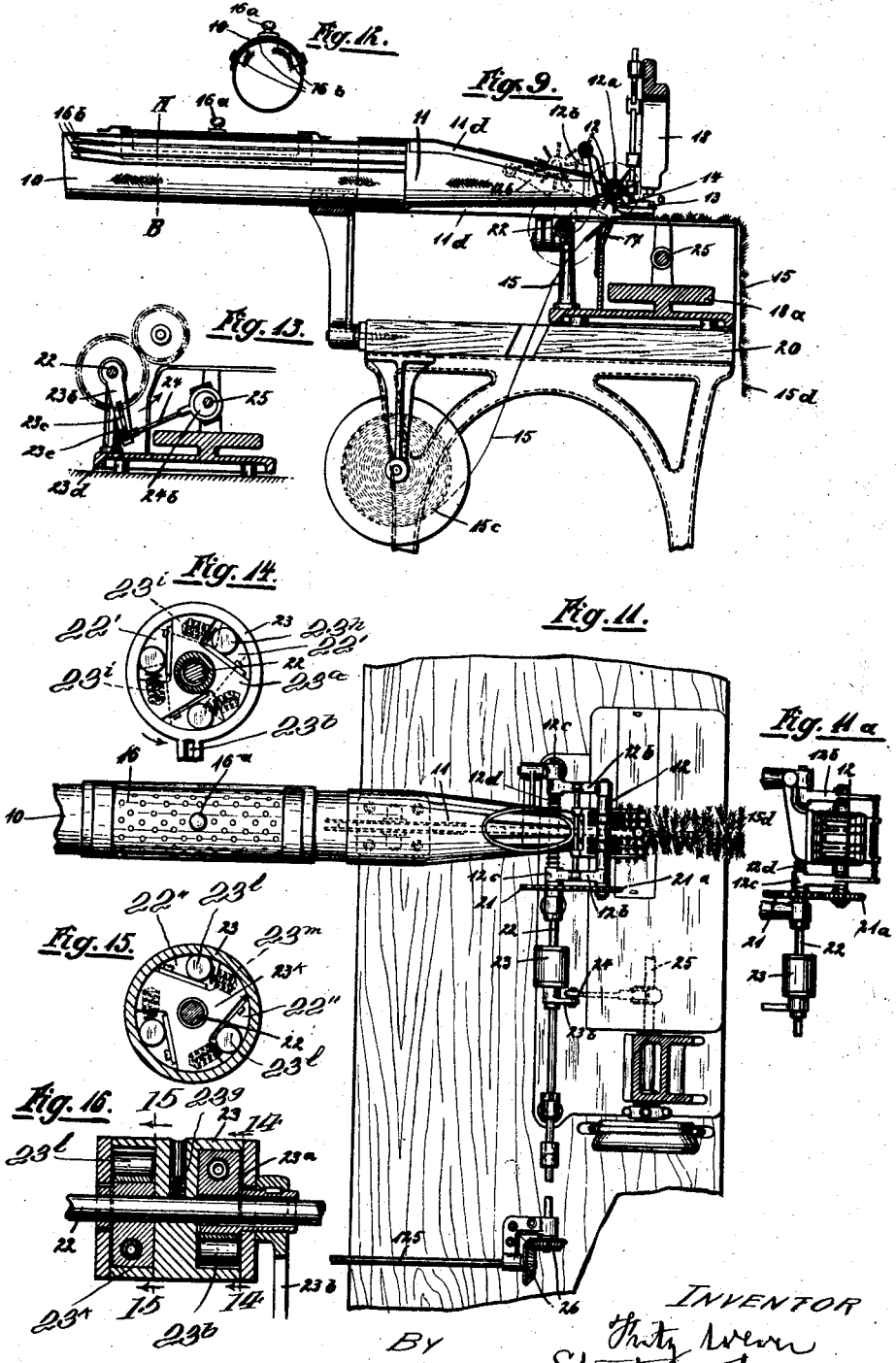

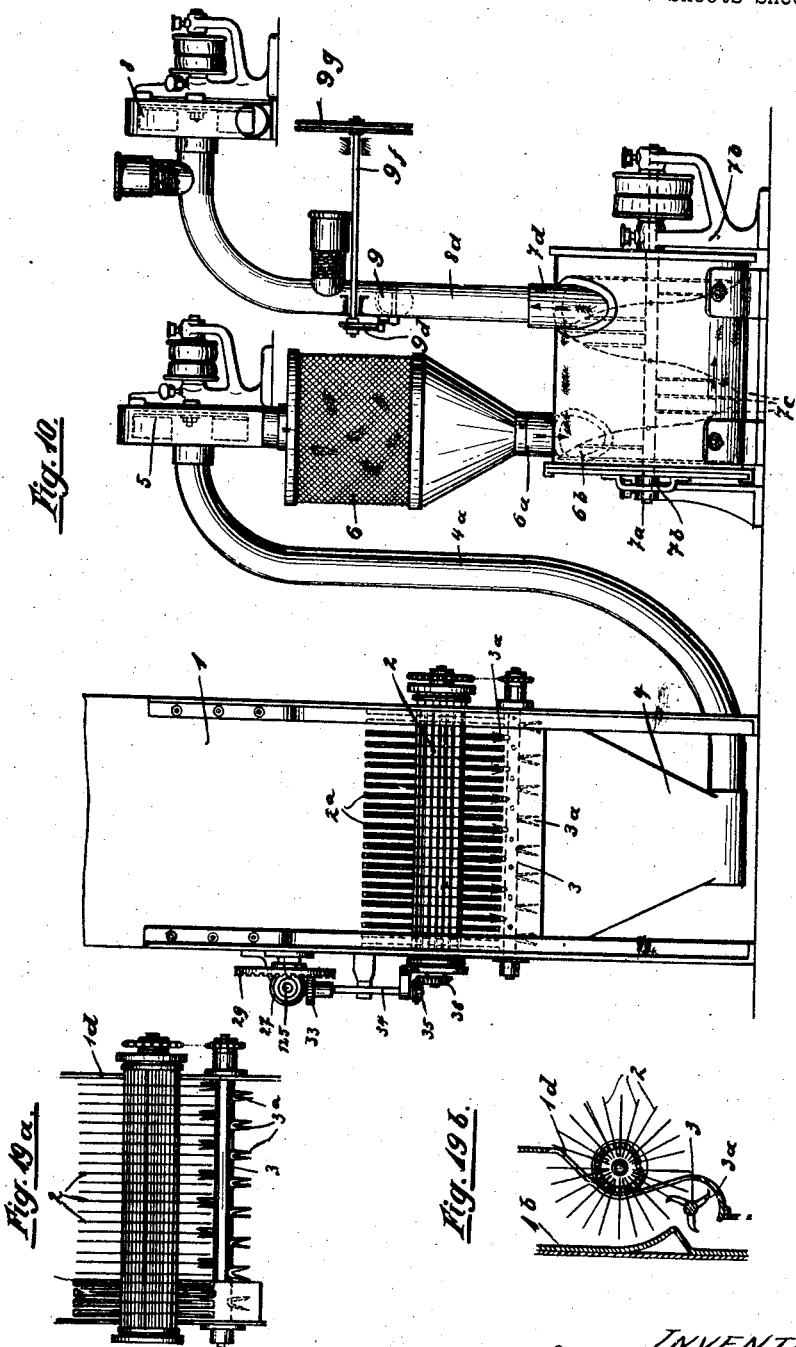

March 1, 1927.
F. WEVER
1,619,493
FEATHER LINED MATERIAL AND PROCESS OF MAKING THE SAME
Original Filed May 15, 1922     7 Sheets-Sheet 5
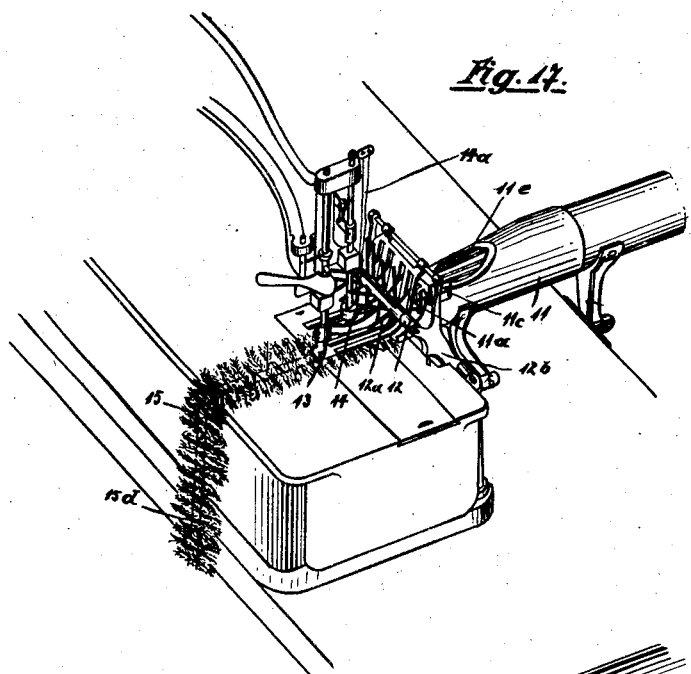
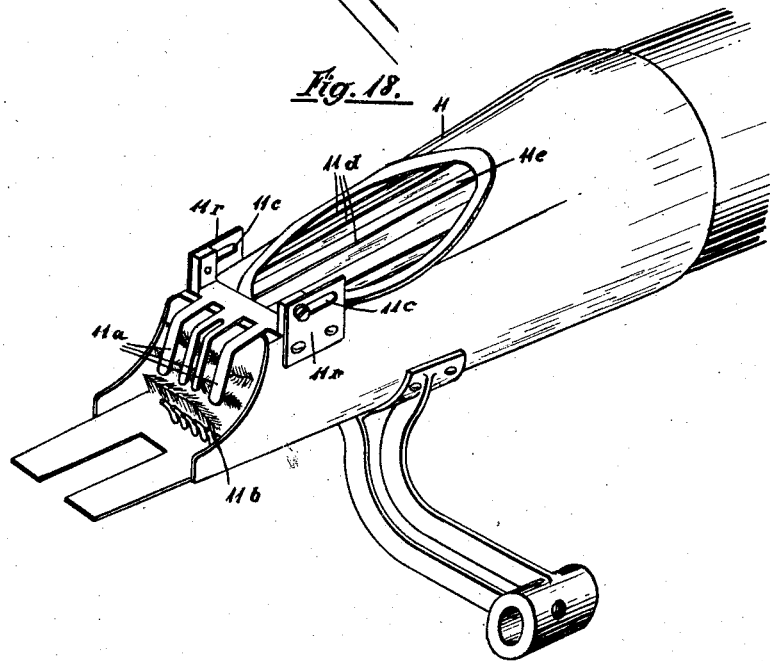

March 1, 1927.
F. WEVER
1,619,493
FEATHER LINED MATERIAL AND PROCESS OF MAKING THE SAME
Original Filed May 15, 1922    7 Sheets-Sheet 6
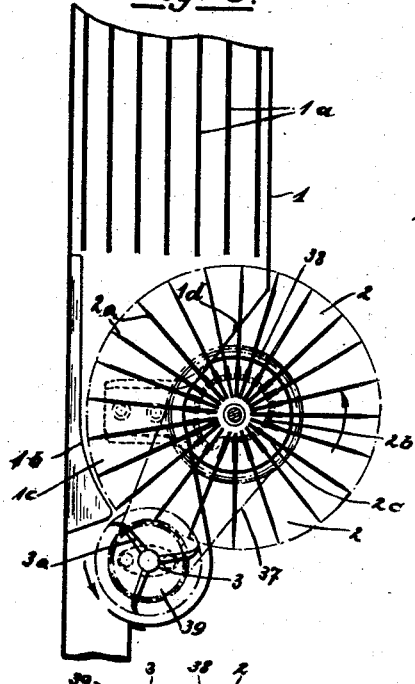
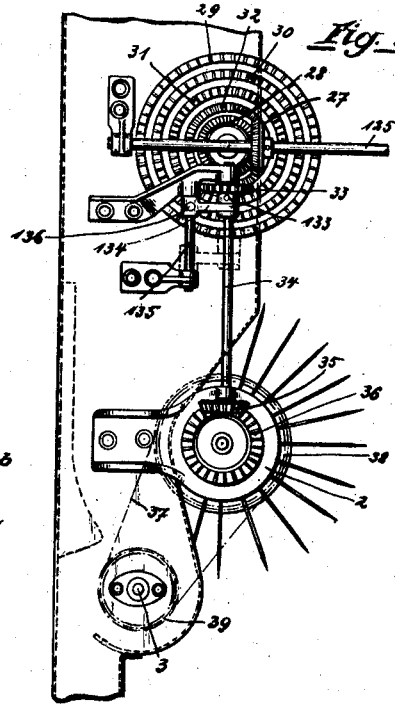
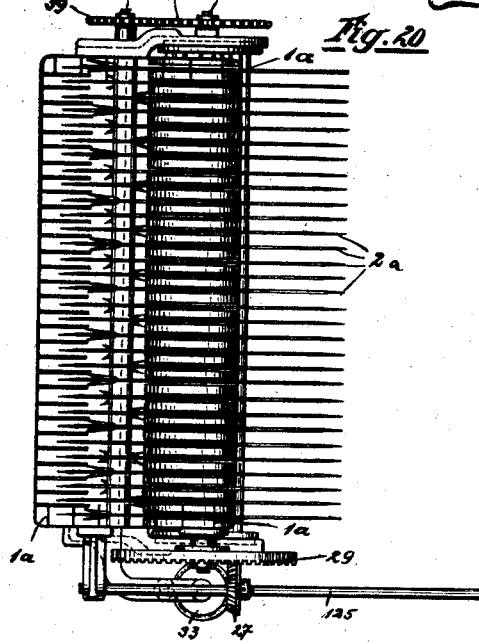
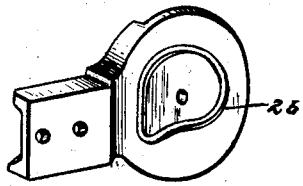
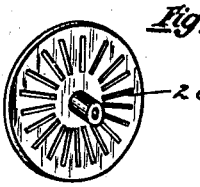

March 1, 1927.
F. WEVER
1,619,493
FEATHER LINED MATERIAL AND PROCESS OF MAKING THE SAME
Original Filed May 15, 1922    7 Sheets-Sheet 7
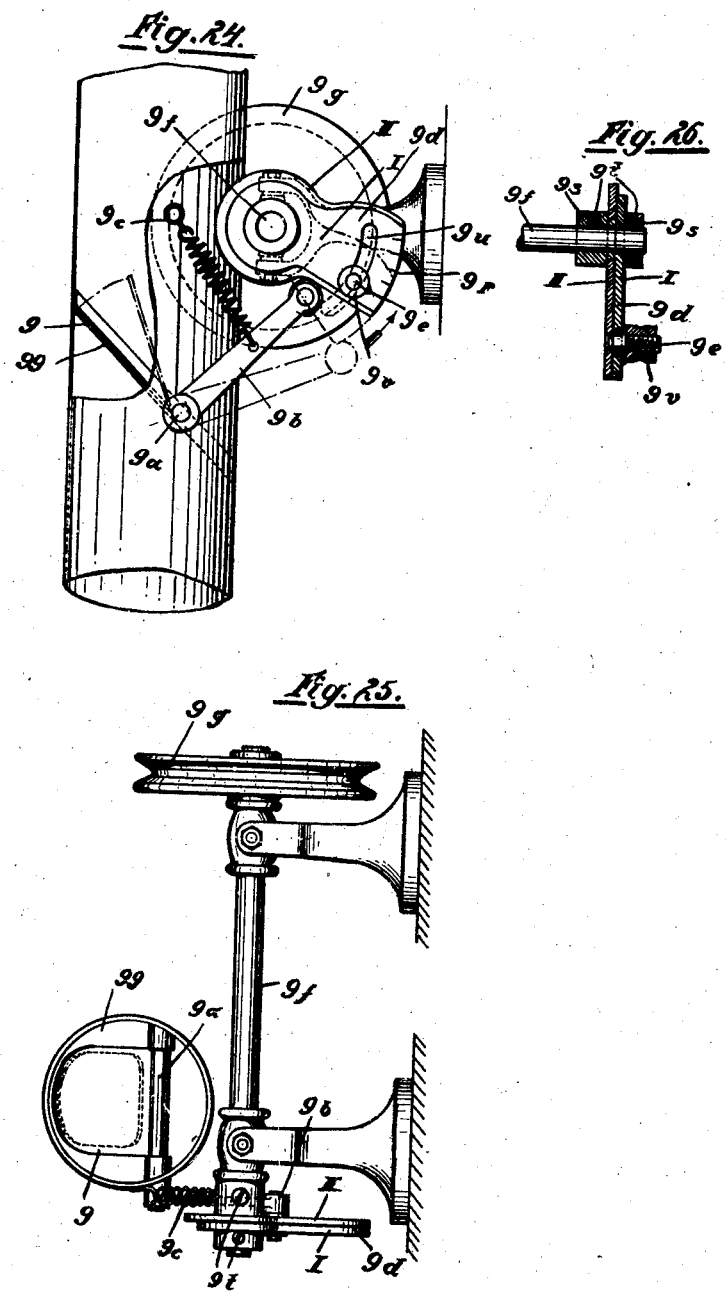

Patented Mar. 1, 1927.

1,619,493

UNITED STATES PATENT OFFICE.

FRITZ WEVER, OF STUTTGART, GERMANY; HENRI MARMIGNAT ADMINISTRATOR OF SAID WEVER, DECEASED.

FEATHER-LINED MATERIAL AND PROCESS OF MAKING THE SAME.

Original application filed May 15, 1922, Serial No. 561,216, and in Germany December 14, 1920. Divided and this application filed June 24, 1924. Serial No. 722,186.

This invention relates to the art of making fur or plumage-like material, and in particular such material as is made by securing feathers to supporting layers of sheet material, such as cloth or other textiles. Such material is adapted for use for cloaks, overcoats and garments of other descriptions, for covers, and, in general, for all of the uses to which furs are applied, and it may be applied as an interior lining or an exterior covering.

The invention comprises certain subject-matter described in my co-pending application for Letters Patent of the United States, Serial Number 561,216, which has matured into Patent No. 1,599,386, dated Sept 7, 1926, of which this is a divisional application, and has for its object a method of securing feathers to a supporting sheet material firmly, and in such a manner as to present an even and finished appearance and at the same time to simplify and facilitate the work of such attachment.

For such purposes, my invention comprises a method of first securing the feathers to a strip or band of textile or other suitable material and in then securing such feather lined strip or band to a broad layer of supporting textile or other material in such a way preferably that the sections of the feather lined band so secured are substantially parallel. The ends of the feathers projecting beyond the band, and thus forming a fringe, may in such case be so arranged that each row of feathers overlaps the feathers of the adjoining row, thus forming a plumage-like covering; or the feather fringes or edges may be caused to stand away from the supporting layer, the bands being in such case brought close together to give the whole a fur or plush-like appearance.

My invention also comprises bands or strips of sheet or textile material having feathers secured to them, as set forth above, said feathers being preferably spread on such bands or strips in an indiscriminate arrangement, but also in a generally transverse direction. My invention further comprises a feather clad material made of a layer of supporting textile or other sheet material having arranged thereon such feather-lined strips arranged adjoining one another.

In the accompanying drawings, I have shown what I consider the preferred manner of carrying my invention into practice.

In these drawings—

Figures 1 and 2 are perspective views of a portion of a fabric strip or band with feathers secured thereto under my invention, showing two successive stages of completion;

Fig. 3 is a similar view of a supporting fabric layer having such fabric strips secured thereto to form the completed fabric;

Figs. 4 and 5 are a plan and a perspective view, respectively, of another form of feather-carrying strip or band in two successive stages of completion;

Fig. 6 is a perspective view, showing the feather-carrying strips assembled and secured to a supporting fabric layer;

Fig. 7 is a sewing apparatus for securing a feather-carrying strip to an endless supporting fabric layer, showing the operation of attachment;

Fig. 9 is a similar view of the right-hand portion of an apparatus for carrying out the process under my invention;

Fig. 10 is a front elevation of a portion of the device represented in Fig. 8;

Fig. 11 is a plan view of the sewing apparatus and adjacent parts represented in Fig. 9;

Figs. 11a and 12 are detail views of some parts thereof;

Figs. 13, 14, 15 and 16 represent cross sections of the actuating device for the feed roller connected with the main shaft of the sewing apparatus;

Fig. 17 is a perspective view of the sewing apparatus;

Fig. 18 is a similar view, on an enlarged scale, of the mouth piece leading to the latter;

Fig. 19 is a vertical sectional elevation of a portion of the feather hopper with the stripping and advancing parts;

Fig. 19a is a similar view of the stripping and advancing parts on a reduced scale;

Fig. 19b is a sectional elevation of the same on the same reduced scale;

Fig. 20 is a top plan view of the same on the scale of Fig. 19;

Fig. 21 is a vertical sectional elevation of the actuating mechanism for the stripping and advancing parts;

Figs. 22 and 23 are detail views of said mechanism;

Figs. 24, 25 and 26 are detail views of the valve device arranged in feather duct or conduit.

In all the figures the same parts are indicated by the same reference characters.

Figure 8:
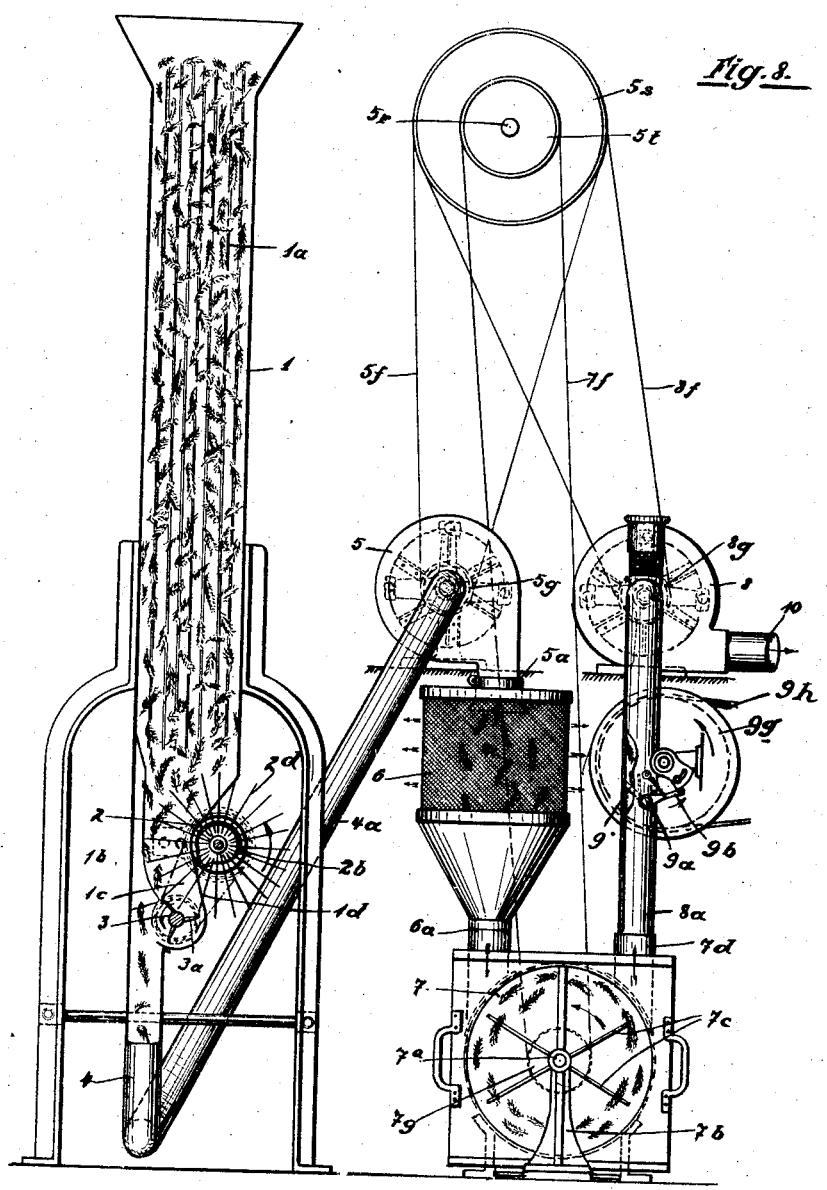
Fig. 8 is a side elevation of the left-hand portion.

In carrying out my invention, feathers of any suitable or desired kind are secured to a strip or band of any suitable sheet material, such as textile fabric, in such a manner as to extend laterally beyond such strip or band to form a fringe-like or scalloped edge on one or on both sides of the strip or band.

In Figs. 1 and 2 I have shown one form of such feather-lined strip or band $15^d$ in successive stages of formation. From said figures it will be seen that feathers F are first spread over the band or strip 66 so as to mainly extend laterally only to one side of the same, whereupon they are secured to said band or strip by two rows of plain stitching 661. In thus spreading and securing the feathers to the strip or band, the feathers will also project to a small extent beyond the edge 662 opposite to the fringed feather edge. In order to make this edge accurately straight, the small projecting portions of the feathers are there bent over onto the strip or band and secured thereto by a line of cross stitching 663, as seen in Figs. 2 and 3, or by other suitable means.

The feather fringe strips or bands thus obtained are then secured, by stitching or otherwise, in substantially parallel arrangement to a supporting layer 64 of sheet material, such as textile fabric of any desired description, as will be understood from an inspection of Fig. 3, wherein 641 indicates the line of stitching employed for this purpose. From this figure it will also be noted that the feather fringes each overlap the feather layers of the adjacent bands or strips so as to form a flat scale-like or plumage like surface. This arrangement is particularly adapted for the longer and stiffer qualities of feathers.

Where the softer grades of feathers, such as the softer tail feathers or what are known as boa feathers, are to be employed, the method of securing them to the supporting layer illustrated in Figs. 4 to 6 is by preference employed. The feathers are here again secured to a band or strip 66 by a double row of stitches 661, but with this difference that the feathers are now disposed so as to extend substantially to an equal extent to both sides of the strip or band, thus forming a fringed edge at each side of the said strip or band. The double fringed band or strip is then bent longitudinally along its middle line so as to form an acute angle in cross section, or to be substantially parallel, as shown in Fig. 5, and secured in this shape in any desired or suitable manner. In the present case a line of stitching made by a two-needle sewing apparatus is employed. Or the connection may be effected in any other suitable way. The double fringed strips or bands are then secured to the supporting layer 64 in substantially parallel rows so as to extend away from and to be substantially perpendicular thereto, as seen in Fig. 6, and in such proximity to each other that the completed fabric has a fur-like appearance. As indicated in Figs. 1 and 4, the feathers are generally applied to the band or strip 44 in a uniform flat layer and in indiscriminate arrangement, that is to say, not accurately spaced or aligned, the quills of the feathers preferably extending in a direction generally transverse to the band or strip.

I find it advantageous to apply the feathers to a band of considerable length, or in the form of a web, in a continuous operation and to attach said web or band, after the feathers have been secured thereto, to the supporting layer 64 in one continuous operation. This manner of securing is illustrated in Fig. 7, where 72 represents a sewing apparatus of any suitable and desired construction and 64 the supporting fabric layer whose ends are secured together, as shown at 79, so as to form an endless sheet or apron. Before sewing, this endless supporting layer is marked with a helical line 70, which extends longitudinally over its entire surface and whose coils are sufficiently close together to form in substance parallel straight lines arranged at the desired distance from one another. Along this helical line 70 the feather fringed strip or band 66 is secured to the supporting layer 64. When this securing operation has been completed and the supporting fabric has been covered with the feather strip or band, the securing connection at 79 is severed and the completed material is ready for use, to be made into garments and employed for other purposes for which it is fitted.

For the purposes of a full disclosure of the invention, I have represented in Figs. 8 to 26 a machine for securing feathers to a narrow band or strip in a uniform, continuous manner, but so that they will lie on the same in an indiscriminate arrangement and at the same time in a generally transverse direction thereto, by reason of the direction of the stitching, which, as best seen in Figs. 11 and 17, is longitudinal to the strip or band.

In these figures, 1 represented the supply hopper or holder through which the feathers are introduced into the apparatus. The supply hopper is provided at two opposite vertical walls with longitudinal ribs $1^a$, designed to facilitate the downward motion of the feather charge by its weight, and to enable the current of suction air to pass into every portion of the hopper and thus to act uniformly on the feather charge. These ribs appear in Figs. 8 and 19. As seen in Figs. 8, 10 19 and 20, the lower end or outlet portion $1^c$ of the hopper is furnished with a device for retaining the feather charge and for withdrawing the feathers in small quantities to be successively delivered for further treatment by the apparatus. This device comprises a series of longitudinal ribs $1^b$, preferably arranged on the wall of the hopper, which lies between the walls on which the ribs $1^a$ are formed, a roller 2 provided with picker needles $2^a$, and a roller 3 provided with stripping forks $3^a$ arranged below and adjacent to the picker needle roller 2 and in such position that the forks will straddle or engage the picker needles $2^a$ as they pass the stripping fork roller, and that said fork will just clear the lower edges of the ribs $1^b$. As shown, the ribs $1^b$ have a curved contour corresponding to the path of the picker needles $2^a$.

The picker needle roller 2 and the stripping fork roller 3 are caused to rotate in the direction indicated by the arrows in Fig. 8 and Fig. 19; that is to say, so that as the picker needles $2^a$ move downward and outward, the stripping forks which engage or straddle these needles, as best seen in Fig. $19^a$, move inward and upward and past the lower corners of the ribs $1^b$, thus stripping the feathers in contact with the picker needles $2^a$, from them and past the ribs $1^b$.

The picker needles $2^a$, beside their rotary movement, have a radially reciprocating motion and so as to advance as they enter the hopper, and then to be retracted as they leave the hopper, said reciprocating movement being imparted to them by a cam groove $2^b$ indicated in Figs. 8, 19 and 22, the needles $2^a$ being also radially guided by studs thereon engaging radial slots $2^c$, Figs. 19 and 23, of the needle supports. The details of the needle reciprocating device being already disclosed in my United States Patent No. 1,483,703, issued February 12th, 1924, and in my German Patent No. 330,444, issued December 14, 1920, and not constituting per se a part of my present invention, need not be further described herein.

The lower portion of the hopper is provided with slots $1^d$, Figs. 8 and 19, to permit the entrance of the picker needles $2^a$ into the hopper.

In order to counteract any tendency in the feathers to agglomerate or to form in lumps, I provide means for loosening the feathers between the holder and the conduit for feeding the feathers to the attaching device. These means in the figures now under consideration comprise a suction pipe $4^a$, an exhaust pump or blower 5, an expansion drum 6 a horizontal drum 7 provided with rotary conveyor arms $7^c$ and terminating in a suction pipe $8^a$ equipped with a trap or valve 9. The arrangement and construction of these parts in detail are, as follows:

The hopper 1 terminates in a downwardly converging portion 4 below the ribs $1^b$ and the stripping fork shaft 3, the said lower portion 4 communicating with the suction pipe $4^a$ which leads to the exhaust pump or blower 5, whose outlets or exit orifice $5^a$ opens into the expansion drum 6, having wire cloth or otherwise perforated sides through which compressed air escapes, thus permitting the feathers, as they issue from the lower orifice $6^a$ to freely drop into the horizontal drum 7 at the inlet $6^b$ near one side and end of said drum. A horizontal shaft $7^a$, journaled in bearings $7^b$, $7^b$ extends centrally through said drum 7 (Figs. 8 and 10). Said shaft carries a series of radial arms $7^c$ arranged thereon helically so as to form a helical conveyor which not only imparts a centrifugal movement to the feathers, but propels them to the end of the drum opposite to that where they enter said drum, thereby forming a thin stream or band of feathers which is in motion toward the outlet $7^d$, of the drum 7, arranged diagonally opposite the inlet or orifice $6^a$. A second suction pump or blower 8 serves to exhaust the air from the drum through the outlet $7^d$ communicating therewith by means of suction pipe $8^a$.

In order to regulate the amount of feathers withdrawn from the drum 7 by the suction pump 8 and to time such withdrawal, a trap or valve 9 is arranged in the suction pipe $8^a$ at an intermediate point, as seen in Figs. 8 and 10, the mechanism for periodically opening and closing said trap or valve being represented in detail in Figs. 24 to 26, inclusive. The trap or valve 9 is arranged to rock or oscillate on the pivot or journal $9^a$ and is rigidly connected with the rock lever $9^b$ provided with a friction roller at its end, while a spring $9^c$ connected to the rock lever $9^b$ at one end and to the suction pipe $8^a$ at the other tends to yieldingly press the trap or valve 9 against its seat 99 within said suction pipe. The rock lever $9^b$ is yieldingly held against the periphery of the cam or wiper $9^d$ by the spring $9^c$, the said cam or wiper being mounted on the rotary shaft $9^f$, which is caused to rotate by the pulley $9^g$ keyed thereto and receiving power from any desired source through the belt $9^h$, Fig. 8. Said belt $9^h$ preferably receives its motion from the sewing or feather attaching mechanism by suitable intermediate gearing. The shaft $9^f$ being caused to rotate in the direction of the arrow in Figs. 8 and 24, the wiper $9^d$ causes the rock lever $9^b$ to rock from the full line position in Fig. 24 to the dotted position of said figure against the stress of the spring 9ᶜ, thereby opening the trap or valve 9, maintaining said lever and valve in such open position for a period of time governed by the length of that part of the periphery of said cam which is the most remote from the centre of rotation, as will be readily understood. In order to vary the length of the period during which the valve is to remain open, the cam or wiper is composed of two superimposed cam disks I and II, which may be shifted axially one with respect to the other, thereby decreasing or increasing the length of the valve opening part of the cam periphery 9ʳ. For this purpose each cam disk is provided with a hub 9ˢ encircling the shaft 9ᶠ and adapted to be fixed thereon by a set screw 9ᵗ. Cam disk I is provided with a slot 9ᵘ concentric to the shaft 9ᶠ and cam disk II with a screw stud 9ᵉ passing through and engaging said slot. When the disks have been adjusted to the desired relative position, for which purpose the set screws 9ᵗ must first be loosened, they are secured in the new position of adjustment by tightening a clamp nut 9ᵛ engaging the screw stud 9ᵉ, the set screws 9ᵗ being then again tightened on the shaft 9ᶠ.

The suction pump 8 blows the air and the feathers from the suction pipe 8ᵃ through the conduit or pipe 10 into the feather spreading device in which the conduit or pipe terminates, and which, as seen in Figs. 9, 11, 17 and 18, is in the form of a nozzle or mouthpiece 11 arranged behind and adjacent to the sewing mechanism, and removably connected to the forward end of the conduit 10, as seen in Figs. 9 and 11. As best disclosed in Fig. 18, the orifice of the said mouthpiece is furnished with a yielding feather retaining device or detent comprising an upper set of prongs or fingers 11ᵃ preferably of resilient material, and a lower series of ribs 11ᵇ preferably arranged to break joint with the said prongs. These prongs co-operate with the ribs to arrest the feathers in their passage through the nozzle and to cause them to lie transversely over the ribs. The prongs 11ᵃ are in the form of a rake which is longitudinally adjustable on the mouthpiece or nozzle by being mounted in its supports 11ʳ by a screw pin and slot connection 11ᵉ as will be readily understood from Fig. 18. The interior surface is provided with a series of longitudinal ribs 11ᵈ, Figs. 9 and 18. Such ribs while permitting the ready escape of the air, serve to prevent the formation of eddy currents of the air which would interfere with the regular and unimpeded issue of the feathers from the orifice. For the same purpose the feed pipe 10 is equipped with a perforated slide 16 having a handle 16ᵃ, the pipe 10 below said slide being so perforated also that when it is desired to permit the escape of air from the pipe the slide may be so shifted as to cause its perforations to register with those of said pipe. As seen in Figs. 9 and 12, this perforated part of the tube is provided with a series of longitudinal ribs 16ᵇ which prevent the feathers from being pressed against the perforations by the air tending to escape when the said perforations are uncovered, and facilitate their forward feed to the orifice by virtue of the greater pressure of the air in the direction of said pipe. At 11ᶜ the nozzle 11 is provided with a window or transparent covering to enable ready inspection of the interior.

A sewing mechanism adapted to produce the two lines of stitching shown in Figs. 1 to 6 and comprising the presser foot 13 and the needle bar 14, for carrying the double needle for the two threads 14ᵃ, Fig. 17, is arranged in advance of the mouthpiece or nozzle 11, as shown in Figs. 9 and 17. Between said sewing apparatus and nozzle is arranged a feather picking mechanism for releasing successive quantities of feathers from the arresting prongs or fingers 11ᵃ and feeding them onto a strip of feather supporting material 15, which is fed to the sewing mechanism from the web 15ᶜ, as best seen in Fig. 9. This feather picking mechanism consists of a roller 12 provided with radial picker needles 12ᵃ arranged thereon, as best seen in Figs. 9, 11 and 17. These picker needles are so arranged as to enter the slots between the prongs 11ᵃ as the roller revolves, and withdraw the feathers held against said prongs by the air current, dropping them onto the band or strip 15 on which they are fed to the needle 14ᵃ and under the presser foot 13, as seen in Figs. 9 and 17.

The roller 12 carrying the picker needles 12ᵃ is journaled in a rock frame 12ᵇ, pivoted to the machine frame at 12ᶜ and yieldingly held against the nozzle 11 as shown by the full lines in Figs. 9, 11 and 17, by a spring 12ᵈ encircling the pivot or journal 22, Figs. 9 and 11, and may be swung out of the way against the stress of said spring into the dotted line position indicated in Fig. 9, in order to expose the parts where the sewing proceeds and to obtain ready access thereto in case of disturbances or interruptions in the sewing operations. For this pupose the mouthpiece 11 is first removed from the conduit 10.

The main shaft of the sewing mechanism, receiving motion from any suitable source of power, is represented at 25, Figs. 11 and 13. It imparts an intermittent rotary motion to the picker needle shaft or roller 12 by any suitable intermittent propelling device. In the present instance this is accomplished by means of an eccentric 24$^b$, Fig. 13, which, through rod 24, oscillates a crank 23$^b$ of the friction clutch device 23, Figs. 11, 13, 14, 15 and 16, mounted on the journal 22.

As will be noted by reference to said Figs. 11, 13, 14, 15 and 16, the said clutch device comprises a cylindrical casing 23 keyed to the shaft 22 by a set screw 23$^g$. Within the casing 23 is arranged the drum 23$^a$ keyed to the crank 23$^b$, which is loosely mounted on shaft 22, and provided with a number of notches or chambers 22′ within each of which is seated a roller 23$^h$ impelled forward by a spring 23$^i$ and just fitting into the space formed by the notch and the inner wall of the casing 23. When the crank moves in the direction of the arrow in Fig. 13 and in Fig. 14, which is a cross section on line 14—14 of Fig. 16, looking in the direction of the arrow in said figure, the rollers 23$^h$ will be clamped or wedged between the casing 23 and the seat of the roller, whereby a partial revolution is imparted to the shaft 22. On the return stroke of the crank 23$^b$ the rollers are released and the drum 23$^a$ returns to its initial position, the shaft 22 remaining stationary during this return movement. In order to positively secure the said shaft against any retrograde movement, a brake drum 23$^k$, also loosely mounted on the shaft 22 and secured to the shaft bearing is arranged in the casing 23, as shown in Figs. 15 and 16. As seen from Fig. 15, this brake drum 23$^k$ is provided with notches 22″ and spring rollers 23$^l$, similarly to the shaft-actuating clutch device 22′, 23$^h$, but with the difference that, in this case, the rollers are pressed in the reverse direction by the springs 23$^m$. By this means any tendency of the shaft to reverse its rotation on the return stroke of the crank 23$^b$ will be immediately arrested by the fact that the rollers 23$^l$ will be clamped between their seats and the casing wall.

The intermittent rotary motion of the journal 22 is transmitted to picker needle roller 12 by means of the gear wheels 21 and 21$^a$, as shown in Figs. 11 and 11$^a$. The journal or shaft 22, by means of the intermeshing bevel gear wheels 26, transmits motion to the longitudinal shaft 125, Figs. 11, 20 and 21. The shaft 125 is provided at its other end with a bevel gear wheel 27 meshing with a bevel gear 28 forming a fixed part of a disk formed with four concentric crown gears 29 to 32 thereon. The picker needle shaft 2, as shown in Figs. 10 and 21, has keyed to its end a bevel gear wheel 36, meshing with a beveled gear wheel 35, mounted at the lower end of a shaft 34 bearing at its upper end a pinion or gear wheel 33, which is longitudinally shiftable on said shaft 34 so as to be adjusted to engage or mesh with any one of the four crown gearings 29 to 32 and adapted to be secured in each position of adjustment. For this purpose, as shown in Fig. 21, the said pinion 33 is mounted on a hub 133 slidably keyed to shaft 34 and held in each position of adjustment by an arm 134, one end of which loosely encircles the hub 133, so as to permit it to revolve therein, while the other end engages a stud 135 secured to the hopper 1, on which it may be vertically shifted and secured in each position of vertical adjustment by the set screw 136. By this arrangement the pinion 33 may be caused to engage any desired one of the crown gearings 29 to 32 and to be rotatably secured in each position. As seen in Figs. 19 and 21, motion is transmitted from the picker needle shaft 2 to the shaft 3 carrying the stripping forks 3$^a$ by means of a belt or chain 37 running over pulleys or sprocket wheels 38 and 39 on the shafts 2 and 3, respectively.

In order to vary the extent or speed of rotation of the shaft 22 and thereby the quantity of feathers removed from the hopper 1, at each impulse, the end of rod 24, Figs. 11 and 13, is secured to the crank 23$^b$ by a pin 23$^d$ engaging a slot 23$^c$ in said crank and adapted to be secured in any desired position of adjustment, as best seen in Fig. 13.

The suction pumps 5 and 8 and the radial conveyor arms 7$^c$ are actuated from a common main power shaft 5$^r$ by means of belts or chains 5$^f$, 8$^f$ and 7$^f$, respectively, running over main pulleys or sprocket wheels 5$^s$ and 5$^t$ and pulleys 5$^g$, 8$^g$ and 7$^g$, respectively, as shown in Fig. 8. The power from said main shaft 5$^r$ may also be transmitted, directly or indirectly, to the main shaft 25 of the sewing mechanism and to the pulley 9$^g$, Fig. 8.

In operation the feathers as they descend in the hopper 1 are, at the lowermost portion of the hopper, fed downward by the picker needles 2$^a$ as the needle roller 2 revolves in the direction of the arrow, Fig. 8, until they are taken off from the picker needles by the stripper forks 3$^a$, rotating as indicated by the arrow, and drawn down past the lower corner of the ribs 1$^b$, so as to drop into the downwardly converging portion 4, such action being aided by the draft from the suction pipe 4$^a$. Thence the suction pump 5 draws them through the pipe 4$^a$, dropping them into the expansion drum 6, from which they pass downward into the drum 7, to be fed therefrom in a thin stream passing onward to the exit 7$^d$, due to the centrifugal and forwarding action of the helically arranged radial arms 7$^c$. As the valve or trap 9 in the suction pipe 8$^a$ is periodically opened, portions of this feather stream are drawn into the feed tube 10 by the suction pump 8, the quantity of feathers being governed by the time the adjustable valve or trap remains open at each impulse. Through the tube 10 the feathers pass on to the nozzle 11 at the forward end of which they are arrested by the prongs 11ª, being withdrawn therefrom by the picker needles 12ª of the intermittently revolving needle shaft 12, and deposited on the advancing band or ribbon 15, the band with the feathers thereon then passing under the presser foot 13, and needle bar 14 of the sewing mechanism, where the feathers are connected to the band or ribbon by stitching, as above explained, and the whole issues from the machine in the form of a feather lined or fringed strip 15ᵈ, as shown in Figs. 9, 11 and 17. By adjusting the supports 11ʳ and with them the prongs or feather arrester 11ª away from or toward the picker needles 12ª, a less or greater quantity of feathers will be withdrawn from the nozzle and, accordingly, the layer of feathers deposited on and secured to the band 15 will be of less or greater thickness. By this co-operation of the picker needles and the retaining fingers the feathers are spread in an even, uniform and continuous layer on the band or strip 15 as it passes below these parts and are in this condition secured to the band by the sewing mechanism.

While I have herein described the apparatus shown in Figs. 8 to 26 in illustration of the means for carrying out my process, the same is not herein claimed since it forms the subject-matter of the claims of my co-pending application, Serial Number 561,216, filed May 15, 1922.

What I claim herein and desire to secure by Letters Patent of the United States is:

1. In the art of forming feather lined material, the process which consists in securing a feather lined band or strip to an endless sheet of supporting material along a substantially helical line.

2. In the art of forming feather lined material, the process which consists in stitching a feather lined band or strip to an endless supporting sheet of textile material along a substantially helical line.

3. Feather lined material consisting in a band or strip of textile material, in combination with feathers spread thereon and extending beyond both edges of the band, said band being bent along an intermediate line and secured in such bent position.

4. Feather lined material consisting in a supporting layer of textile material, in combination with a plurality of substantially parallel strips secured to the supporting layer substantially perpendicular thereto, said strips having feathers extending beyond both edges of each strip stitched thereto, and being bent or folded along an intermediate longitudinal line and secured in such bent condition by stitching.

In testimony whereof, I affix my signature.

FRITZ WEVER.